United States Patent [19]
Dominguez

[11] Patent Number: 5,582,070
[45] Date of Patent: Dec. 10, 1996

[54] MECHANICAL LIMITING DEVICE FOR RACK TRAVEL

[76] Inventor: Armando Dominguez, 8081 NW. 66th St., Miami, Fla. 33166

[21] Appl. No.: 498,938

[22] Filed: Jul. 6, 1995

[51] Int. Cl.⁶ .................................................. F16H 57/12
[52] U.S. Cl. ..................... 74/411; 74/422; 74/409; 74/89.12; 192/143
[58] Field of Search ................ 74/411, 422, 409, 74/89.17, 89.12; 192/143

[56] References Cited

U.S. PATENT DOCUMENTS

| | | | |
|---|---|---|---|
| 2,806,689 | 9/1957 | Miller | 192/143 |
| 3,589,205 | 6/1971 | Radovic | 74/422 |
| 4,687,361 | 8/1987 | Kikuchi et al. | 74/422 |
| 5,167,164 | 12/1992 | Maekawa et al. | 74/422 |

Primary Examiner—Charles A. Marmor
Assistant Examiner—David Fenstermacher
Attorney, Agent, or Firm—J. Sanchelima

[57] ABSTRACT

A device for mechanically limiting the travel of a moving object along a path parallel to a travel rack bar. The ends of the travel rack bar include narrow extensions that come within a pair of elongated members of a moving rack member that are kept at a cooperative spaced apart relationship with respect to each other. The travel is accomplished through a pinion gear that is meshed with the travel rack and when it reaches the end of the narrow extension it pulls in the spring loaded moving members thereby maintaining the meshed engagement of the pinion gear at all times with either the rack member extension or the moving member.

5 Claims, 3 Drawing Sheets

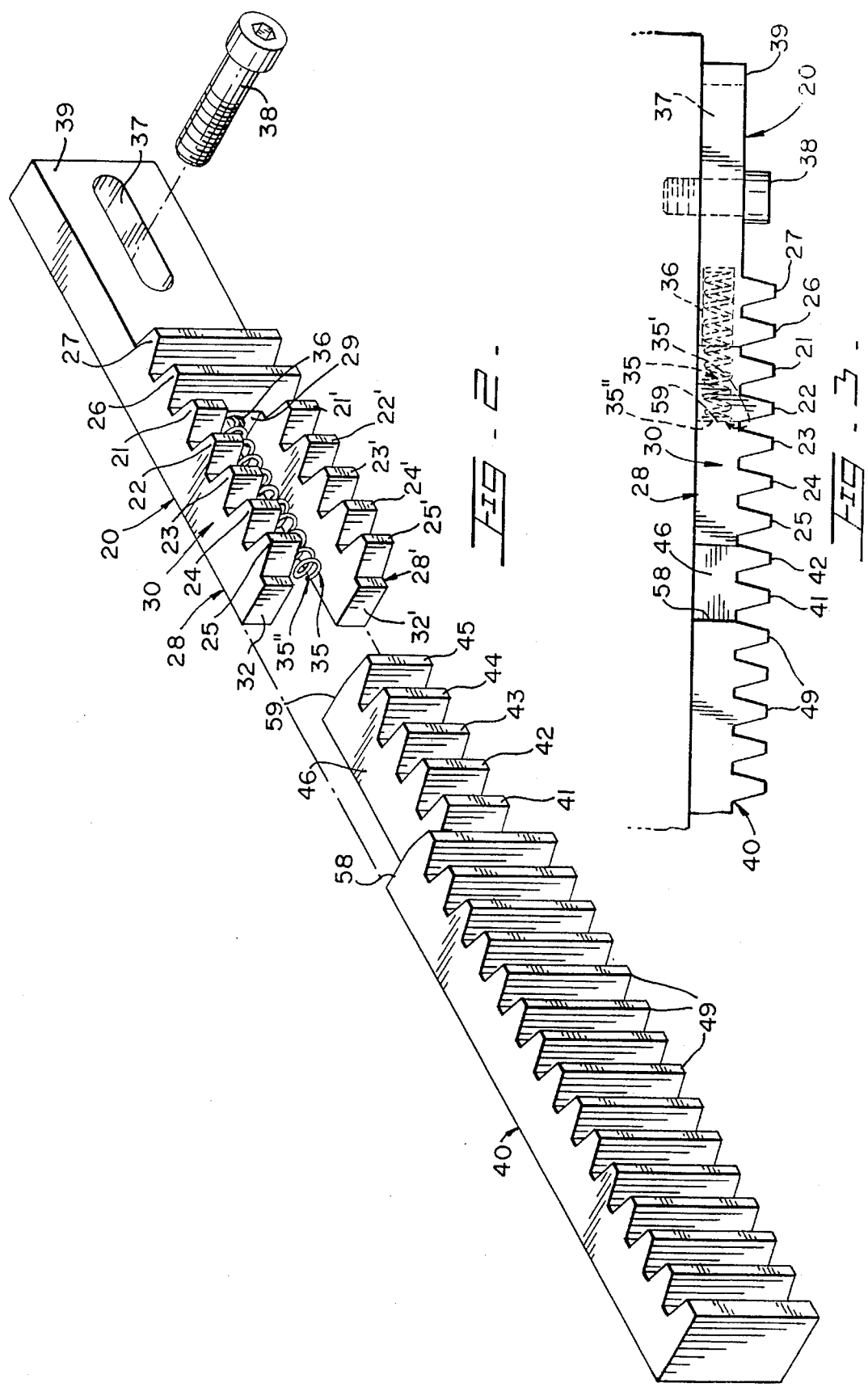

5,582,070

MECHANICAL LIMITING DEVICE FOR RACK TRAVEL

BACKGROUND OF THE INVENTION

1. Field of the Invention.

The present invention relates to a mechanical limiting device for rack travel.

2. Description of the Related Art.

Several mechanisms, including electro-mechanical ones, have been designed in the past to limit the travel of carrier assemblies along a rack to which the carrier assembly is typically engaged through a meshed pinion gear. One of those mechanisms includes the use of a micro-switch to interrupt the electrical power being supplied to the motor driving the pinion gear. The present invention, on the other hand, is a totally mechanical device that does not require electricity. Also, the present invention does not overload the pinion gear or connected driving mechanism thereby avoiding any damage.

SUMMARY OF THE INVENTION

It is one of the main objects of the present invention to provide a mechanical limiting device for the travel of a carrier with a pinion gear meshed on a rack.

It is another object of this invention to provide such a device that does not damage the meshed pinion by overloading it at the end of the rack travel.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2 shows an isometric view of the movable and rigid members of the present invention at one of the ends of a travel rack.

FIG. 3 is a partial top view of the movable rack bar member shown in FIG. 2 engaged to one end of the rigid member showing the spring in phantom.

V. DETAILED DESCRIPTION OF THE PREFERRED EMBODIMENT

Figure 1:
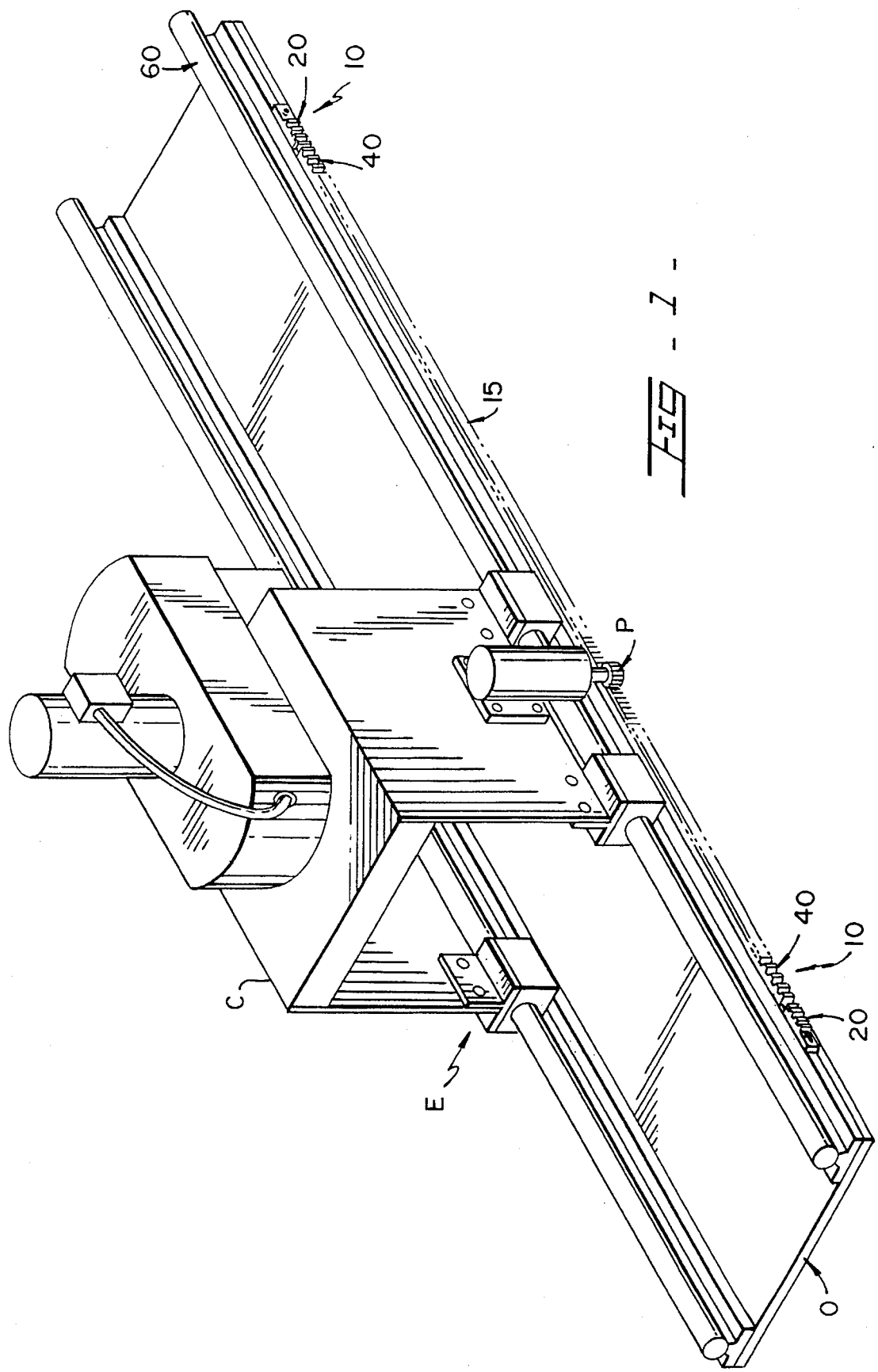
FIG. 1 represents an isometric view from the top of the preferred embodiment for the mechanical limiting device subject of the present invention.

Referring now to the drawings, where the present invention is generally referred to with numeral 10, it can be observed that it basically includes rigid rack bar member 40 at one end of travel rack 15 and movable rack bar member 20. In the preferred embodiment, movable rack bar member 20 is slidably mounted to rail 60 of stationary object O. Rigid rack bar member 40 is rigidly mounted to a stationary object O. Carrier C is typically part of equipment E that is slidably mounted to stationary object O and driven by pinion gear P along travel rack 15 and the ends of which corresponding to rigid rack bar members 40. In FIG. 1, equipment E is a marble cutting table using mechanical limiting devices 10 at each end of travel rack 15, as shown in FIG. 1. However, this is only an illustration of an application. Many other applications exist for equipment that use limiting devices for the travel of a carrier along a travel rack.

Movable rack bar member 20 of device 10, as best seen in FIG. 2, includes flat portion 39 and teethed portion 30. Teethed portion 30, in one of the preferred embodiments, includes legs 28 and 28' that are at a parallel and spaced apart relationship with respect to each other. Legs 28 and 28' include teeth 21; 22; 23; 24; 25 and 21'; 22'; 23'; 24' and 25', respectively. Teethed portion 30, also includes teeth 26 and 27 extended along the width of movable rack bar member 20. Flat portion 39 has longitudinal slot 37 through which bolt member 38 passes. Bolt member 38 is rigidly mounted to object O. Slot 37 permits movable rack member 20 to slidably reciprocate when pinion P reaches teeth 26 and 27. Legs 28 and 28' and connecting central wall 29 form a fork which cooperatively receives narrow end 46 of rigid rack bar member 40. Connecting central wall 29 has longitudinal cavity 36 inside which end spring 35' of spring 35 is partially housed. Protruding end 35" is positioned between legs 28 and 28', as shown in FIGS. 2; 3 and 4. Pinion gear P meshes with teeth 49 and travels towards one of its ends where device 10 is installed. When central wall 29 approaches wall 59 of narrow end 46 by the action of pinion P, wall 59 compresses spring 35 inside longitudinal cavity 36 thereby urging member 20 against the force of the teeth of pinion P.

Figure 4:
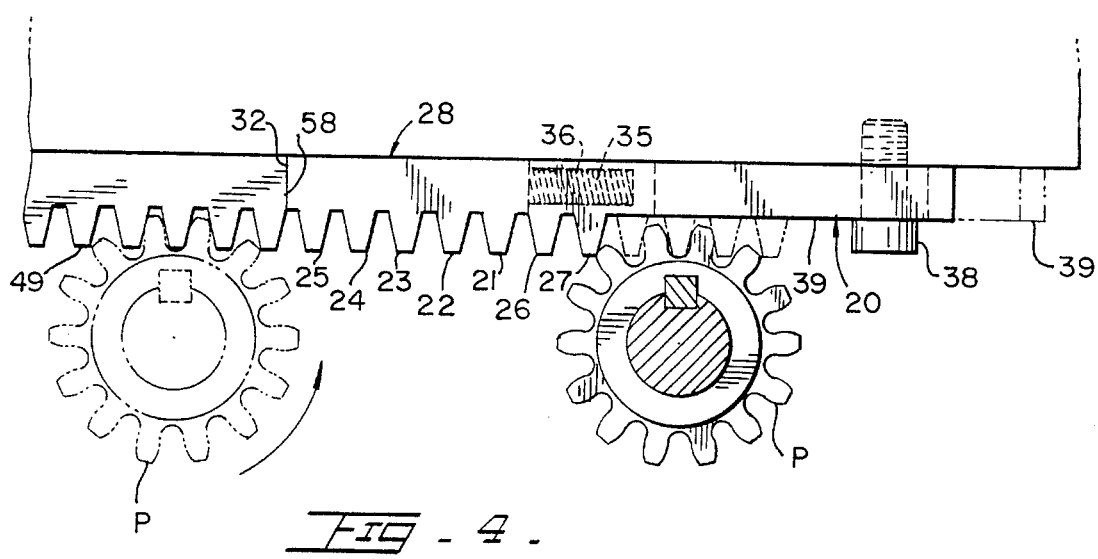
FIG. 4 illustrates a partial top view of this invention showing the two extreme positions for an alternate embodiment of the movable rack bar member and a pinion gear in phantom meshing with the teeth of the rigid rack bar member, and in solid meshing with the teeth of the movable member.

Teeth 23; 24; 25 and 23'; 24'; 25' are aligned with teeth 43; 44 and 45 of member 40. This alignment permits pinion gear P to travel along the distal end of rigid rack bar member 40, as best seen in FIGS. 3 and 4. As seen in FIG. 4, pinion gear P, in solid lines, has moved to the end of its travel. Pinion gear P is shown in phantom meshed with teeth 49 as it approaches the end. Pinion gear P approaches teeth 41 and 42 of rigid rack bar member 40, and passes them. Teeth 25 and 25' and tooth 43, represented in FIG. 2, are in alignment when member 20 is at rest. In FIG. 3, only tooth 25 can be seen since teeth 43 and 25' are behind. In FIG. 4, tooth 43 still cannot be seen because it is behind tooth 23. Once pinion gear P passes tooth 45 aligned with teeth 23 and 23' and reaches teeth 22 and 22', movable member 20 starts traveling towards rigid member 40 since tooth 45 is the last rigid tooth. At this time, wall 59 of narrow end 46 urges protruding end 35" of spring 35 within cavity 36. Then, pinion gear P pulls in teeth 26 and 27 without any further travel. Walls 32 and 32' of member 20 are brought against wall 58 of rigid member 40. Similarly, central wall 29 of movable member 20 is brought towards wall 59 of rigid member 40, thereby housing completely spring 35 within cavity 36, as shown in FIG. 4. In this manner, after pinion gear P passes last tooth 45, pinion P remains rotatably moving in the place continuously pushing last tooth 27 which in term is biased by spring 35 against the force applied by pinion gear P. And, movable member 20 reciprocates back and forth along its longitudinal axis until a user switches off the pinion P or the direction for travel pinion P is changed. This reciprocal displacement is relatively small.

Figure 5:
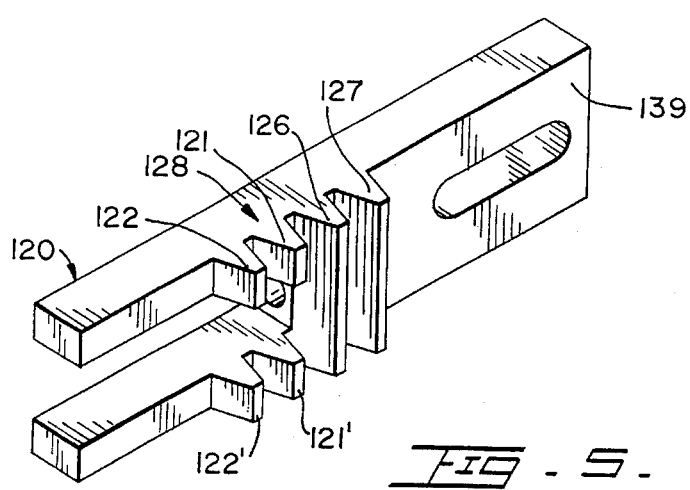
FIG. 5 shows an isometric view of an alternate embodiment for the movable member of the present invention.
Figure 6:
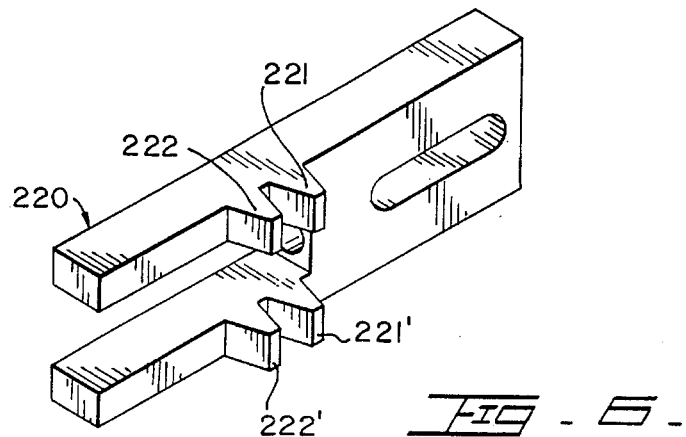
FIG. 6 shows an isometric view of another alternate embodiment for the movable member of the present invention.

In FIGS. 5 and 6, two alternate embodiments are shown for movable rack members 120 and 220. In FIG. 5, member 120 is shown with the same flat portion 139 and teethed portion 128. In contrast with member 20, teeth 23; 23'; 24; 24'; 25 and 25' have been eliminated. Everything else is similar and provides the same function.

Teeth 121; 121'; 122 and 122' perform the function of teeth 21; 21'; 22 and 22' in the preferred embodiment. Therefore, there is no alignment between teeth of rigid and movable members 40 and 20, when at rest. Finally, in FIG. 6 member 220 is shown. Member 220 lacks the equivalent of teeth 126 and 127 in FIG. 5. Pinion P remains in place when it reaches tooth 45, causing the latter to reciprocate along its longitudinal axis in a similar fashion. At rest, there is no alignment. It is only after pinion P passes tooth 45 of member 40 that alignment of teeth 221; 221'; 222 and 222' is achieved with teeth 44 and 45. It has been experienced that device 10 cannot properly work with less than two teeth especially, to permit it to start the travel backwards.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A device for mechanically limiting the travel of a moving object along a path parallel to a travel rack bar having two ends and said travel rack bar having a plurality of teeth including a pinion gear meshed with said teeth, and said device comprising:

A) a rigid rack bar member mounted on at least one of the ends of said travel rack bar, said rigid rack bar member including a centrally disposed narrow end of said travel rack bar with a width smaller than the width of said travel rack bar and including a plurality of teeth contiguously extending from said plurality of teeth in said travel rack bar;

B) a movable rack bar member coaxially disposed with respect to said rigid rack bar member, said movable rack bar member being coaxially and movably mounted to said fixed object and including first and second ends, said first end having first and second elongated members kept in a parallel and spaced apart relationship with respect to each other to house said narrow end between said first and second elongated members including at least two teeth to cooperatively engage said pinion gear;

C) spring means for biasing said movable rack away from said rigid rack member so that the axial movement of said movable rack member caused by said pinion gear is opposed by said spring means thereby permitting said pinion gear to travel to the end of said narrow end maintaining meshed engagement with the last of said teeth on said first and second elongated members.

2. The device set forth in claim 1 wherein said second elongated member includes also at least two teeth positioned in cooperative alignment with the teeth of said first elongated member.

3. The device set forth in claim 2 wherein said movable rack bar member includes a flat portion adjacent to said first and second elongated members, and said flat portion includes at least one tooth that is cooperatively positioned with respect to said teeth on said first and second elongated members and designed for engagement with said pinion gear.

4. The device set forth in claim 3 wherein said flat portion includes a longitudinal cavity for partially housing said spring means.

5. The device set forth in claim 4 wherein said flat portion includes a longitudinal slot, and fastening means inserted through said slot and supporting said movable rack bar member along with said first and second elongated members.

* * * * *